Sept. 28, 1954
F. W. KRUEGER
2,690,245
SPEED CONTROL SYSTEM

Filed Dec. 14, 1951
2 Sheets-Sheet 1

FRANK W. KRUEGER,
INVENTOR.

BY
Mellin and Hanscom
ATTORNEYS

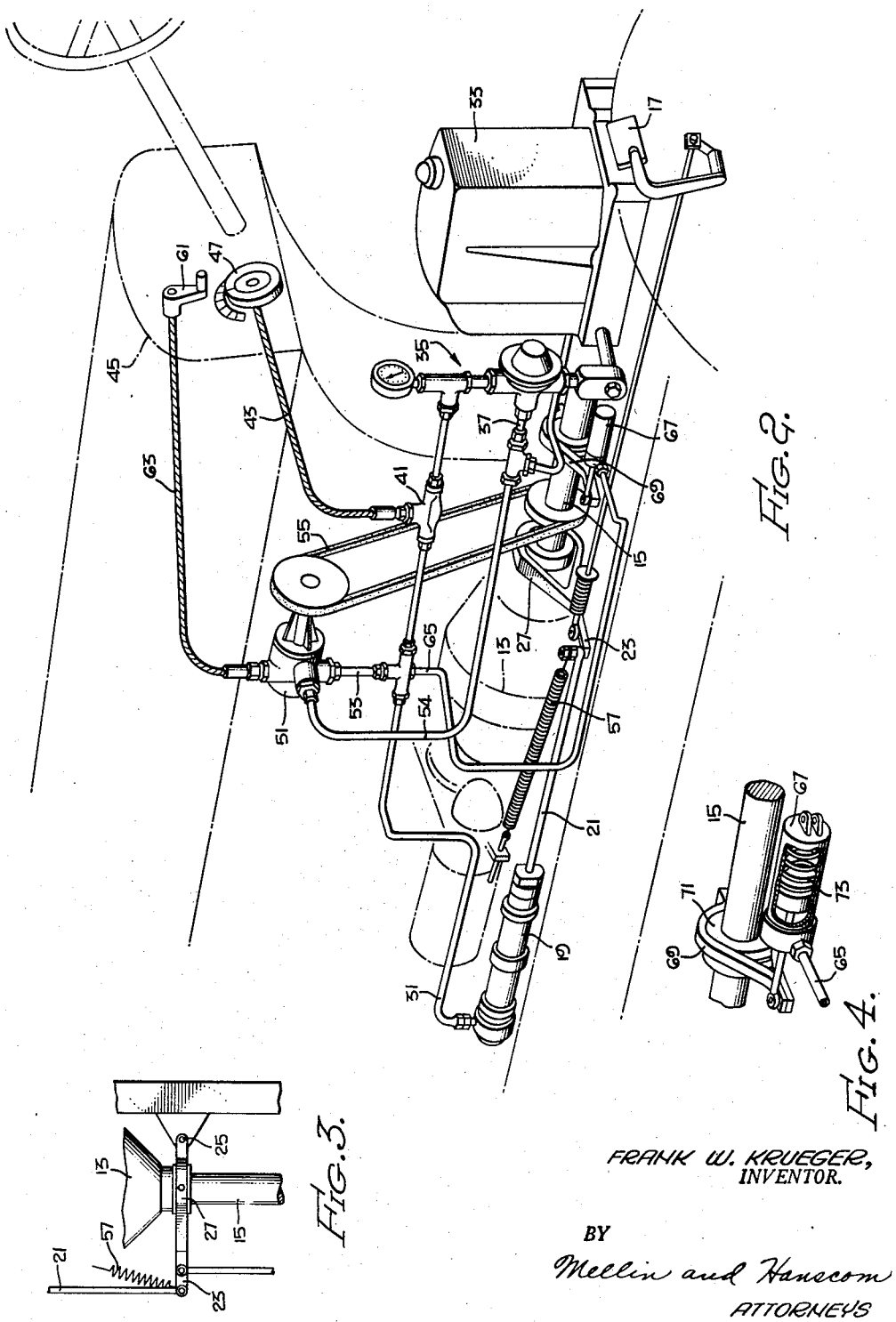

Patented Sept. 28, 1954

2,690,245

UNITED STATES PATENT OFFICE 2,690,245

SPEED CONTROL SYSTEM

Frank W. Krueger, San Carlos, Calif., assignor to
Tomlinson I. Moseley, Atherton, Calif.

Application December 14, 1951, Serial No. 261,689

10 Claims. (Cl. 192—12)

This invention relates to a control system for a power driven vehicle and in particular to a speed control system for such a vehicle.

It is important that various power driven vehicles be controlled so that although the resistance to movement of a vehicle varies, the speed thereof remains substantially constant. The operation of various machines, such as earth-working or digging machines, mowing and reaping machines, and the like, are detrimentally affected by sudden changes in the speed of travel thereof upon encountering variations in resistance to travel. At the present time, the only practical way to obtain a constant speed is for the operator to manually control the speed of the vehicle, usually by operation of an acceleration pedal or equivalent speed control contrivance.

It is a main object of the present invention to provide a simple and reliable speed control system which can be easily and readily installed in or applied to a power driven vehicle and when so applied will control the operation thereof so that various constant speeds can be obtained upon particular settings of the speed control system, said constant speeds being obtained regardless of the changes in resistance to travel of the machine.

Another object of the present invention is to provide such an arrangement as above described in which the control system can be adjusted so that the power driven vehicle can be optionally driven at a range of very slow speeds or a range of normal speeds, and which system will at both ranges remain sensitive to changes in resistance to travel of the machine without hunting.

Still another object of the present invention is to provide a system as above described in which there is a braking arrangement for preventing over-running of the clutch by the vehicle when the vehicle is urged under the influence of gravity to move down a sloping terrain at a speed greater than that at which the clutch would normally drive the vehicle.

Various other objects of the present invention will be apparent from the following description taken in connection with the accompanying drawings wherein:

Fig. 2 is an enlarged fragmentary view showing the speed control system.

Fig. 3 is a fragmentary view in plan showing the manner of mounting the clutch yoke on the frame of the tractor.

Fig. 4 is a fragmentary view in perspective showing the brake for the tractor.

Figure 1:
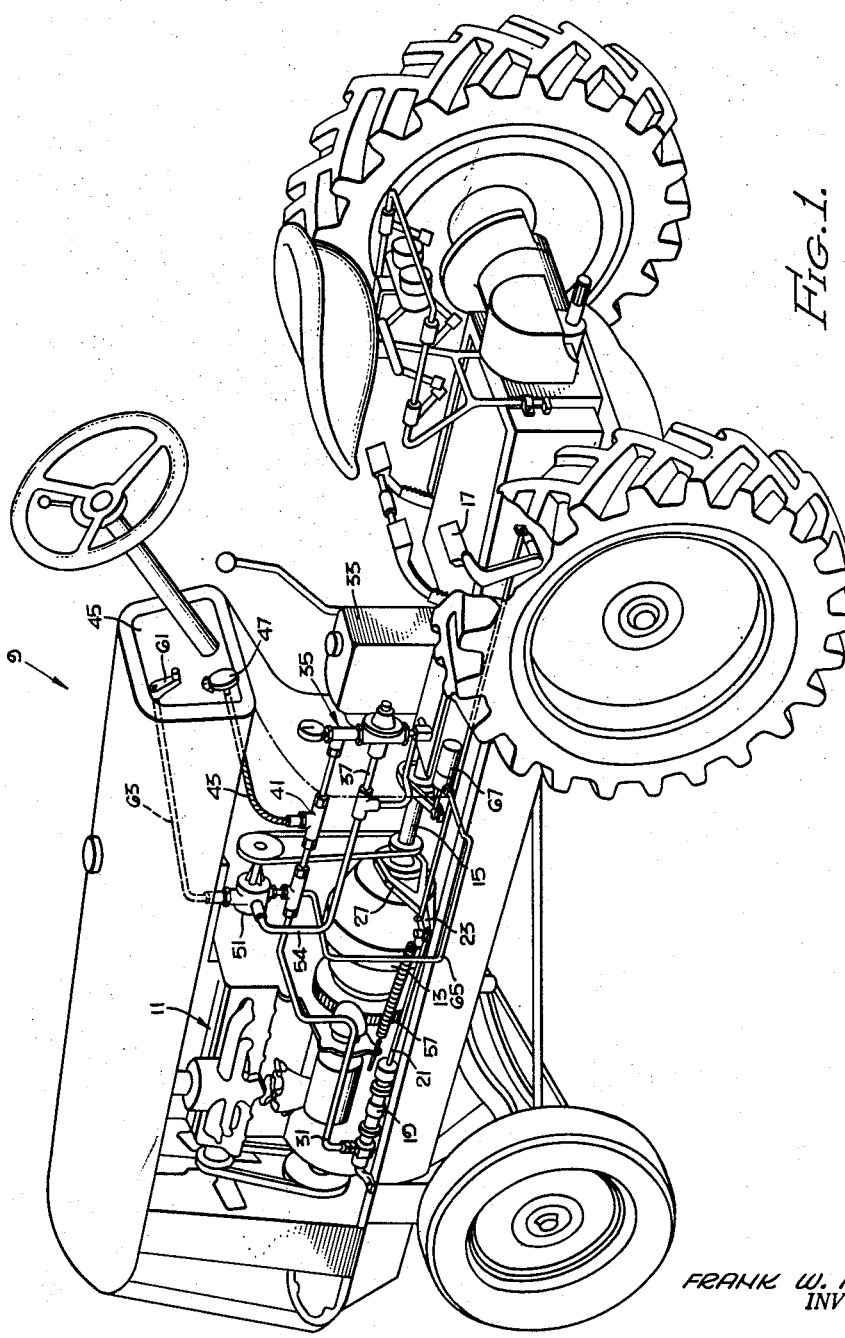
Fig. 1 is a perspective view of a tractor having the speed control system of the present invention applied thereto.

Referring to the accompanying drawings wherein similar reference characters designate similar parts throughout, the arrangement disclosed includes a power driven vehicle, in the drawings represented by a tractor 9, having a motor 11 driving a variable torque clutch 13, which when operating drives a drive shaft 15, said drive shaft being drivingly connected to the rear wheels of the vehicle through the usual differential. Clutch 13 is of conventional construction and is disclosed in Reissue Patent 22,577. The clutch is adapted to be manually controlled by a suitable foot pedal 17.

For automatically controlling the setting of the variable torque clutch 13, there is provided a hydraulic actuator 19 including a cylinder and a piston, the piston not being shown, but being provided with a piston rod 21 connected at its free end to a lever 23 which is pivoted at 25 on the frame of the vehicle (see Fig. 3). The free end of lever 23 is pivotally connected to a clutch control yoke 27 adapted, when actuated, to set the clutch for a torque output proportional to the position of the yoke.

The hydraulic mechanism 19 is adapted to be supplied with fluid under pressure through a line 31 by a pump 33 driven directly from motor 11 by a drive arrangement (not shown). Pump 33 can be a constant pressure output pump of any suitable design, the specific pump arrangement shown including a pressure regulating or pop valve 35 adapted, upon increase in pressure beyond a predetermined amount, to bleed fluid back through a return line 37 to the input reservoir of pump 33. Actually, in the specific arrangement shown, which is not intended to limit the invention, pump 33 is a fairly high pressure pump so that the valve 35 is in constant operation to maintain a substantially constant pressure in the pressure line 31.

There is a valve 41 in line 31, which valve 41 may be a needle valve or its equivalent. Valve 41 is adapted to be controlled by a flexible shaft 43 from the dashboard 45 of the tractor by a suitable setting knob 47. Between valve 41 and hydraulic mechanism 19, there is located a variable volume pump 51 conected by an intake line 53 to line 31 and by an output line 54 to return line 37. Pump 51 is driven by a suitable drive 55 from drive shaft 15.

A suitable tension spring 57 connects lever 23 to the frame of the machine and operates to urge yoke 27 in a direction to reduce the torque output of clutch 13. Spring 57 is opposed by the operation of the hydraulic mechanism 19.

The capacity or volume output per cycle of operation of pump 51 is adapted to be adjusted by a control handle 61 connected to the pump by a flexible shaft 63.

Connected to pressure line 31 by a line 65 and adapted to be actuated by fluid pressure upon opening of valve 41 is a hydraulic actuator 67 connected to a yoke 69, the latter being pivotally mounted on the frame of the machine in a manner not shown but similar to the manner of mounting yoke 27. Yoke 69 when actuated releases a brake 71 mounted on drive shaft 15, said brake being spring urged toward braking position by a spring 73 (see Fig. 4).

The operation of the device is as follows: Motor 11 is started and the throttle hand set at a fixed open position. At this time valve 41 is still closed, and, therefore, spring 57 is operable to cause the clutch 13 to be set in a position for having very little or no torque output. Brake 71 is at this time actuated by spring 73. Upon opening of valve 41 by manipulation of knob 47, hydraulic fluid is supplied through line 31 to hydraulic mechanism 19, pump 33 immediately supplying fluid under pressure upon operation of motor 11 since the pump is directly driven from the motor and not from the clutch 13. Fluid passing through valve 41 is fully effective on actuators 19 and 67, since at this time there is no rotation of drive shaft 15 and accordingly pump 51 is not in operation, so that fluid is not as yet diverted from line 31. Operation of actuator 19 shifts clutch 13 to a position to start travel of the tractor and whatever implement it is pulling, and operation of actuator 67 releases brake 71. Upon movement of the tractor, pump 51 is rotated through drive 55 and begins to divert fluid from line 31 back to the pump 33, and this diverting action will increase in proportion to the speed of drive shaft 15. Depending on the setting of the knob 47 and upon the mean resistance to movement of the tractor, the tractor will attain a speed where the amount of fluid diverted by the pump 51 is substantially the same as the amount of fluid passing through valve 41 to thereby attain a state of equilibrium.

If the machine encounters less resistance and tends to increase in speed, pump 51 will be driven at a higher speed by drive 55, therefore diverting more fluid from the line 31 and therefore lessening the fluid pressure on the hydraulic mechanism 19 to shift the clutch 13 to a position of less torque output and therefore reduce the speed to maintain a substantially constant tractor speed.

If the machine encounters greater resistance, pump 51 will be driven at a lower speed by drive shaft 15 and divert less fluid, therefore causing a higher torque setting of the clutch to bring the speed of the machine back up to its previous speed.

When going downhill, the tractor tends to overrun the clutch, and shaft 15 upon speeding up causes pump 51 to divert an increased amount of fluid to partially or wholly inactivate actuator 67 and allow spring 73 to operate brake 71 to slow down the tractor. The speed of the tractor will, therefore, be maintained substantially constant even when the tractor is going downhill.

A higher or lower speed of the machine can be attained by further opening or further closing valve 41.

As previously described, the capacity or volume per cycle of operation of pump 51 can be varied by adjustment of handle 63. The adjustment of pump 51 is utilized only for the purpose of adapting the control system for operation when the tractor is driven at a creep or low speed. At that time, the control system is not as sensitive as it is when the tractor is operating at higher speeds because of the slow rotative movement of shaft 15 and, therefore, the slow operation of pump 51. In order to increase the sensitiveness of the system, knob 63 is turned to increase the capacity of pump 51. This makes the system sufficiently responsive so that a substantially constant selected low speed can be maintained even though the resistance to travel varies rather sharply, such as, for instance, when topping a sharp rise or boulder. The same high capacity of pump 51 is not satisfactory for normal operational speeds of the vehicle because the system tends to hunt.

It will be apparent that by the present invention, a speed control system has been provided which can be readily applied to a power driven vehicle of any suitable type to control the speed of the vehicle so that the vehicle travels at a substantially constant speed regardless of variation in the resistance to movement thereof or variations in the grade of the terrain traversed.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A device of the class described, comprising: a motor-driven vehicle including a variable torque clutch in the drive thereof, means providing a source of fluid pressure, a hydraulically actuated mechanism connected to said clutch and communicating with the source of fluid pressure by means of a fluid pressure line for varying the setting of the clutch in accordance with the pressure of the fluid effective against said mechanism, a valve in said line between said source and said mechanism for varying fluid flow through said line, and means driven by the clutch and connected to said line at a point between said valve and said mechanism for diverting fluid from said line whereby, when resistance to movement of said vehicle varies, transiently varying the speed of the vehicle at the existing torque output of the clutch, the last-named means will be driven at a slower or higher speed to divert less or more fluid from the line and affect the mechanism accordingly to cause a variation in the torque output of the clutch to an extent such as to bring the vehicle back to its previous speed.

2. A device of the class described, comprising: a motor-driven vehicle including a variable torque clutch in the drive thereof, means providing a source of fluid under pressure, a hydraulically actuated mechanism connected to said clutch and communicating with the source of fluid pressure by means of a fluid pressure line for varying the setting of the clutch in accordance with the pressure of the fluid effective against said mechanism, a valve in said line between said source and said mechanism for varying fluid flow through said line, a pump driven by the clutch and connected to said line at a point between said valve and said mechanism for diverting fluid from said line whereby, when resistance to movement of said vehicle varies, transiently varying the speed of the vehicle at the existing torque output of the clutch, said pump will be driven at a slower or higher speed to divert less or more fluid from the line and affect the mechanism accordingly to cause a variation in the torque output of the clutch to an extent such as to bring the vehicle back to its previous speed, and means for varying the volume output per cycle of operation of the pump.

3. A device of the class described, comprising: a motor-driven vehicle including a variable torque clutch in the drive thereof, means driven by the motor of the vehicle providing a substantially constant source of fluid under pressure, a hydraulically actuated mechanism connected to said clutch and communicating with the source of fluid pressure by means of a fluid pressure line for varying the setting of the clutch in accordance with the pressure of the fluid effectively against said mechanism, a valve in said line between said source and said mechanism for varying fluid flow through said line, a pump driven by the clutch and connected to said line at a point between said valve and said mechanism for diverting the fluid from said line whereby, when resistance to movement of said vehicle varies, transiently varying the speed of the vehicle at the existing torque output of the clutch, said pump will be driven at a slower or higher speed to divert less or more fluid from the line and affect the mechanism accordingly to cause a variation in the torque output of the clutch to an extent such as to bring the vehicle back to its previous speed.

4. A device of the class described, comprising: a motor-driven vehicle including a variable torque clutch in the drive thereof, means driven by the motor of the vehicle providing a substantially constant source of fluid under pressure, a hydraulically actuated mechanism connected to said clutch and communicating with the source of fluid pressure by means of a fluid pressure line for varying the setting of the clutch in accordance with the pressure of the fluid effective against said mechanism, a valve in said line between said source and said mechanism for varying fluid flow through said line, a pump driven by the clutch and connected to said line at a point between said valve and said mechanism for diverting the fluid from said line whereby, when resistance to movement of said vehicle varies, transiently varying the speed of the vehicle at the existing torque output of the clutch, said pump will be driven at a slower or higher speed to divert less or more fluid from the line and affect the mechanism accordingly to cause a variation in the torque output of the clutch to an extent such as to bring the vehicle back to its previous speed, and means for varying the volume output per cycle of operation of the pump.

5. A device of the class described, comprising: a motor-driven vehicle including a variable torque clutch in the drive thereof, means providing a source of fluid under pressure, a hydraulically actuated mechanism communicating with the source of fluid pressure by means of a fluid pressure line for varying the setting of the clutch in accordance with the pressure of the fluid effective against said mechanism, said mechanism including a hydraulic cylinder, a piston in the cylinder connected to the clutch, a spring urging the piston in a direction to decrease the torque output of the clutch, a valve in said line between said source and said mechanism for varying fluid flow through said line, and a pump driven by the clutch and connected to said line at a point between said valve and said mechanism for diverting fluid from said line whereby, when resistance to movement of said vehicle varies, transiently varying the speed of the vehicle at the existing torque output of the clutch, said pump will be driven at a slower or higher speed to divert less or more fluid from the line and affect the mechanism accordingly to cause a variation in the torque output of the clutch to an extent such as to bring the vehicle back to its previous speed.

6. A device of the class described, comprising: a motor-driven vehicle including a variable torque clutch in the drive thereof, means providing a source of fluid under pressure, a hydraulically actuated mechanism communicating with the source of fluid pressure by means of a fluid pressure line for varying the setting of the clutch in accordance with the pressure of the fluid effective against said mechanism, said mechanism including a hydraulic cylinder, a piston in the cylinder connected to the clutch, a spring urging the piston in a direction to decrease the torque output of the clutch, a valve in said line between said source and said mechanism for varying fluid flow through said line, a pump driven by the clutch and connected to said line at a point between said valve and said mechanism for diverting fluid from said line whereby, when resistance to movement of said vehicle varies, transiently varying the speed of the vehicle at the existing torque output of the clutch, said pump will be driven at a slower or higher speed to divert less or more fluid from the line and affect the mechanism accordingly to cause variation in the torque output of the clutch to an extent such as to bring the vehicle back to its previous speed, and means for varying the volume output per cycle of operation of the pump.

7. A device of the class described, comprising: a motor-driven vehicle including a variable torque clutch in the drive thereof, means driven by the motor of the vehicle for providing a substantially constant source of fluid under pressure, a hydraulically actuated mechanism communicating with the source of fluid pressure by means of a fluid pressure line for varying the setting of the clutch in accordance with the pressure of the fluid against said mechanism, said mechanism including a hydraulic cylinder, a piston in the cylinder connected to the clutch, a spring urging the clutch in a direction to decrease the torque output thereof, a valve in said line between said source and said mechanism for varying fluid flow through said line, and a pump driven by the clutch and connected to said line at a point between said valve and said mechanism for diverting fluid from said line whereby, when resistance to movement of said vehicle varies, transiently varying the speed of the vehicle at the existing torque output of the clutch, said pump will be driven at a slower or higher speed to divert less or more fluid from the line and affect the mechanism accordingly to cause a variation in the torque output of the clutch to an extent such as to bring the vehicle back to its previous speed.

8. A device of the class described, comprising: a motor-driven vehicle including a variable torque clutch in the drive thereof, means driven by the motor of the vehicle for providing a substantially constant source of fluid under pressure, a hydraulically actuated mechanism communicating with the source of fluid pressure by means of a fluid pressure line for varying the setting of the clutch in accordance with the pressure of the fluid against said mechanism, said mechanism including a hydraulic cylinder, a piston in the cylinder connected to the clutch, a spring urging the clutch in a direction to decrease the torque output thereof, a valve in said line between said source and said mechanism for varying fluid flow through said line, a pump driven by the clutch and connected to said line at a point between said valve and said mechanism for diverting fluid from said line whereby, when resistance to movement of said vehicle varies, transiently varying the speed of the vehicle at the existing torque output of the clutch, said pump will be driven at a slower or higher speed to divert less or more fluid from the line and affect the mechanism accordingly to cause a variation in the torque output of the clutch to an extent such as to bring the vehicle back to its previous speed, and means for varying the volume output per cycle of operation of the pump.

9. A device of the class described, comprising: a motor-driven vehicle including a variable torque clutch in the drive thereof, means providing a source of fluid under pressure, a hydraulically actuated mechanism communicating with the source of fluid pressure by means of a fluid pressure line for varying the setting of the clutch in accordance with the pressure of the fluid effective against said mechanism, a valve in said line between said source and said mechanism for varying fluid flow through said line, a pump driven by the clutch and connected to said line at a point between said valve and said mechanism for diverting fluid from said line whereby, when resistance to movement of said vehicle varies, transiently varying the speed of the vehicle at the existing torque output of the clutch, said pump will be driven at a slower or higher speed to divert less or more fluid from the line and affect the mechanism accordingly to cause a variation in the torque output of the clutch to an extent such as to bring the vehicle back to its previous speed, said motor-driven vehicle having a braking means, means urging the braking means toward braking means, and a hydraulic mechanism connected to the fluid pressure line at a point between the valve and the first-named hydraulic mechanism for releasing said braking means against the resistance of the last-named means to an extent proportional to the pressure existing in said line at the last-named point.

10. A device of the class described, comprising: a motor-driven vehicle including a variable torque clutch in the drive thereof, means driven by the motor of the vehicle providing a substantially constant source of fluid under pressure, a hydraulically actuated mechanism connected to said clutch and communicating with the source of fluid pressure by means of a fluid pressure line for varying the setting of the clutch in accordance with the pressure of the fluid effective against said mechanism, a valve in said line between said source and said mechanism for varying fluid flow through said line, a pump driven by the clutch and connected to said line at a point between said valve and said mechanism for diverting the fluid from said line whereby, when resistance to movement of said vehicle varies, transiently varying the speed of the vehicle at the existing torque output of the clutch, said pump will be driven at a slower or higher speed to divert less or more fluid from the line and affect the mechanism accordingly to cause a variation in the torque output of the clutch to an extent such as to bring the vehicle back to its previous speed, said motor-driven vehicle having a braking means, means urging the braking means toward braking position, and a hydraulic mechanism connected to the fluid pressure line at a point between the valve and the first-named hydraulic mechanism for releasing said braking means against the resistance of the last-named means to an extent proportional to the pressure existing in said line at the last-named point.

References Cited in the file of this patent

UNITED STATES PATENTS

| Number | Name | Date |
|---|---|---|
| 2,492,720 | Tyler | Dec. 27, 1949 |